US012679539B2

(12) United States Patent
Pernechele

(10) Patent No.: US 12,679,539 B2
(45) Date of Patent: Jul. 14, 2026

(54) GRAVITATIONAL AND/OR PNEUMATIC RESTRAIN AND RELEASE MECHANISM FOR AN EXTERNAL AIRBORNE LOAD

(71) Applicant: AEREA S.p.A., Turate (IT)

(72) Inventor: Luca Andrea Pernechele, Sesto San Giovanni (IT)

(73) Assignee: AEREA S.p.A., Turate (IT)

( * ) Notice: Subject to any disclaimer, the term of this patent is extended or adjusted under 35 U.S.C. 154(b) by 968 days.

(21) Appl. No.: 17/933,596

(22) Filed: Sep. 20, 2022

(65) Prior Publication Data

US 2023/0106196 A1     Apr. 6, 2023

(30) Foreign Application Priority Data

Sep. 24, 2021     (IT) ........................ 102021000024590

(51) Int. Cl.
*B64D 1/06*          (2006.01)
*B33Y 80/00*        (2015.01)

(52) U.S. Cl.
CPC ................ *B64D 1/06* (2013.01); *B33Y 80/00* (2014.12)

(58) Field of Classification Search
CPC .. B64D 1/06; B33Y 80/00; B25J 15/10; B25J 15/103; B25J 15/0033
USPC ........................................... 294/82.26, 82.34
See application file for complete search history.

(56) References Cited

U.S. PATENT DOCUMENTS

| | | | | |
|---|---|---|---|---|
| 2,491,400 A | * | 12/1949 | Thumim | B64D 1/04 |
| | | | | 294/82.26 |
| 2,592,577 A | * | 4/1952 | Elmer | F42B 3/006 |
| | | | | 294/82.26 |

| | | | | |
|---|---|---|---|---|
| 3,056,623 A | * | 10/1962 | Herbert | B64D 1/06 |
| | | | | 294/82.26 |
| 3,557,550 A | * | 1/1971 | Legarra | F42B 3/006 |
| | | | | 91/394 |
| 3,883,097 A | * | 5/1975 | Billot | B64D 1/06 |
| | | | | 244/137.4 |
| 3,923,275 A | * | 12/1975 | Dexter | B64D 1/06 |
| | | | | 89/1.51 |
| 4,347,777 A | * | 9/1982 | Jakubowski, Jr. | B64D 7/08 |
| | | | | 244/137.4 |
| 5,029,776 A | * | 7/1991 | Jakubowski | F15B 15/16 |
| | | | | 89/1.14 |
| 5,052,639 A | * | 10/1991 | Lemacon | B64D 1/06 |
| | | | | 294/82.26 |
| 7,648,104 B1 | * | 1/2010 | Jakubowski, Jr. | B64D 1/04 |
| | | | | 89/1.53 |
| 10,538,330 B2 | * | 1/2020 | Binkholder | B64D 1/02 |
| 11,465,744 B2 | * | 10/2022 | Hamelin | B64D 7/08 |
| 2006/0108478 A1 | | 5/2006 | Bajuyo | |

(Continued)

FOREIGN PATENT DOCUMENTS

GB          2078912 A     1/1982

OTHER PUBLICATIONS

Italian Search Report and Written Opinion dated Apr. 19, 2022, 7 pp.

*Primary Examiner* — Paul T Chin

(74) *Attorney, Agent, or Firm* — Victor Cardona, Esq; Heslin Rothenberg Farley & Mesiti P.C.

(57)          ABSTRACT

Mechanism for restraining and releasing an external airborne load through pneumatic ejection wherein the load supports are made hollow so as to form a tank for the compressed air. The load supports consist of monolithic metal bodies made using an additive manufacturing process.

8 Claims, 4 Drawing Sheets

(56)         References Cited

U.S. PATENT DOCUMENTS

| | | | |
|---|---|---|---|
| 2019/0039733 A1* | 2/2019 | Hayat | ..................... B64D 1/04 |
| 2021/0237886 A1 | 8/2021 | Hamelin | |

* cited by examiner

US 12,679,539 B2

1

GRAVITATIONAL AND/OR PNEUMATIC RESTRAIN AND RELEASE MECHANISM FOR AN EXTERNAL AIRBORNE LOAD

CROSS REFERENCE TO RELATED APPLICATIONS

This application claims priority from Italian Patent Application No. 102021000024590 filed on Sep. 24, 2021, the entire disclosure of which is incorporated herein by reference.

FIELD OF THE INVENTION

The present invention generally relates to restrain and release systems for airborne loads (BRU, Bomb Rack Unit) which are used in the aeronautical and aerospace industries for constraining an external load to the structure of the aircraft (carriage), releasing it and thus safely separating it upon the pilot's command (release or jettison). More particularly, the invention relates to ejection release mechanisms (ERU, Ejector Release Unit).

STATE OF THE PRIOR ART

According to the military standards in force (e.g., MIL-STD-8591) external loads (stores) are constrained using a pair of bail lugs and four surfaces on which an equal number of structural components serving as swivelling pads lie. Given that during flight it is important that the BRU guarantees the absence of relative motion between the external load and the structure of the aircraft, so as to prevent phenomena related to impacts and/or over-stresses, this condition is obtained by introducing a predetermined pre-load—specific for each BRU and applied with different design methods—between the bail lugs and the aforementioned areas.

During the controlled release step, the system releases the two bail lugs allowing to separate the load from the vehicle. Depending on the dynamics of the release, two types of BRUs can be identified:

Ejector Release Unit (ERU): the load is moved away by imparting a determined force through one or more telescopic stems so as to guarantee safe separation. The stems may be operated through a high-pressure gas obtained by activating explosive cartridges (Pyro ERU), or through air stored under high pressure (Cold Gas ERU).

Gravity Release Unit: the load is released but it is separated only through gravity.

The systems for releasing the load by ejection are typical of high-performance aircraft, in which the safe separation is strongly affected by the velocity with which the load is released (end of stroke velocity); the systems for releasing the load by gravity are applied on helicopters or low performance aircraft, wherein the sole dropping by gravity is sufficient to guarantee the correct separation of the load.

It is clear that the ejection systems and they are much more complex to embody on the wings with respect to the gravity systems, both due to the significant restrain reactions proportional to the high operating dynamics, as well as due to the weight and the space required for the ejection devices.

The European patent EP2750970 B1 discloses a system for releasing the load by ejection in which, in order to separate a load from an aircraft, there is provided for a pair of telescopic stems with several stages, which can be extended pneumatically. The high-pressure air is provided by a pneumatic system installed on board the aircraft comprising a pair of smaller gas cylinders and a larger cylinder connected to the telescopic stems by means of a complex rotary turntable valve system.

Besides being heavy and difficult to embody on the aircraft due to the high number of components, this solution also requires periodic maintenance of the devices installed in the aircraft which are difficult to access for the operators.

SUMMARY OF THE INVENTION

The object of the present invention is to provide a mechanism for restraining and releasing an airborne load which combines the simplicity of embodiment on the aircraft characteristic of the gravity devices with the effectiveness of ejection of the load characteristic of devices provided with ejection means.

More particularly, the object of the invention is to provide a restrain and release mechanism provided with pneumatic ejection means that is compact and light, however without reducing the structural strength required to bear the loads generated in flight.

According to the invention this object is attained thanks to a mechanism for restraining and releasing an external airborne load of the type defined in the preamble of claim 1, whose primary characteristic lies in the fact that the load supports are made hollow so as to form a tank for the compressed air.

Thanks to this solution idea, the pneumatic system required to operate the telescopic stems is entirely embedded in the restrain and release mechanism according to the invention, making it ready and easy to install on the aircraft onto which it is designed to be installed.

Such mechanism is therefore effectively capable of combining the simplicity of installation inherent of the solution with release of the load by gravity with the versatility of devices with the ejection of the load.

In a preferred embodiment of the restrain and release mechanism according to the invention, each load support consists of a hollow monolithic metal body made by means of an additive manufacturing process.

The structural characteristics of the monolithic metal body ensure that the arms have small overall dimensions and they are extremely light, while maintaining the strength appropriate to bear both the pressure of the compressed air therein and the external loads under all operating conditions of the aircraft. Furthermore, the additive manufacturing technique makes such arms manufacturable in a relatively simple, quick, reliable and cost-effective manner.

In an embodiment of the mechanism according to the invention, each of the load supports consists of an inverted Y-shaped body, having an upper central section provided with an internal seat for housing the telescopic stem, and from which a pair of support arms branch out inferiorly.

In a further embodiment of the restrain and release mechanism according to the invention, the body of the mechanism comprises a pneumatic connection which connects the hollow load supports together.

In this manner, when ejecting the load, it is possible to ensure that the same pressure acts simultaneously on the two telescopic stems, therefore ensuring a uniform thrust to release the load.

In a further embodiment of the invention, each stem is held in the retracted position by the pressure exerted by the constrained load on an end plate of each stem.

In this manner, when the hooks release the load for the ejection, the stems will be operated automatically, ensuring full operating reliability of the mechanism according to the invention.

The invention also relates to a system for restraining an external load for use in the aeronautical and aerospace industries, comprising a restrain and release mechanism according to the invention, in which each load support consists of a swivelling pad arm.

BRIEF DESCRIPTION OF THE DRAWINGS

Further characteristics of the invention will be apparent from the following detailed description, with reference to the attached drawings, provided purely by way of non-limiting example, wherein.

DETAILED DESCRIPTION OF THE INVENTION

The systems designed to transport and release external loads for aircraft in flight have the task of ensuring the absence of relative motions between the loads and the support structure onto which they are suspended hence simultaneously ensuring the correct controlled separation of the load from the aircraft.

The restrain and release mechanism according to the invention is of the conventional type. Therefore, only the essential components and those expressly referred to in the invention will be described herein.

Figure 1:
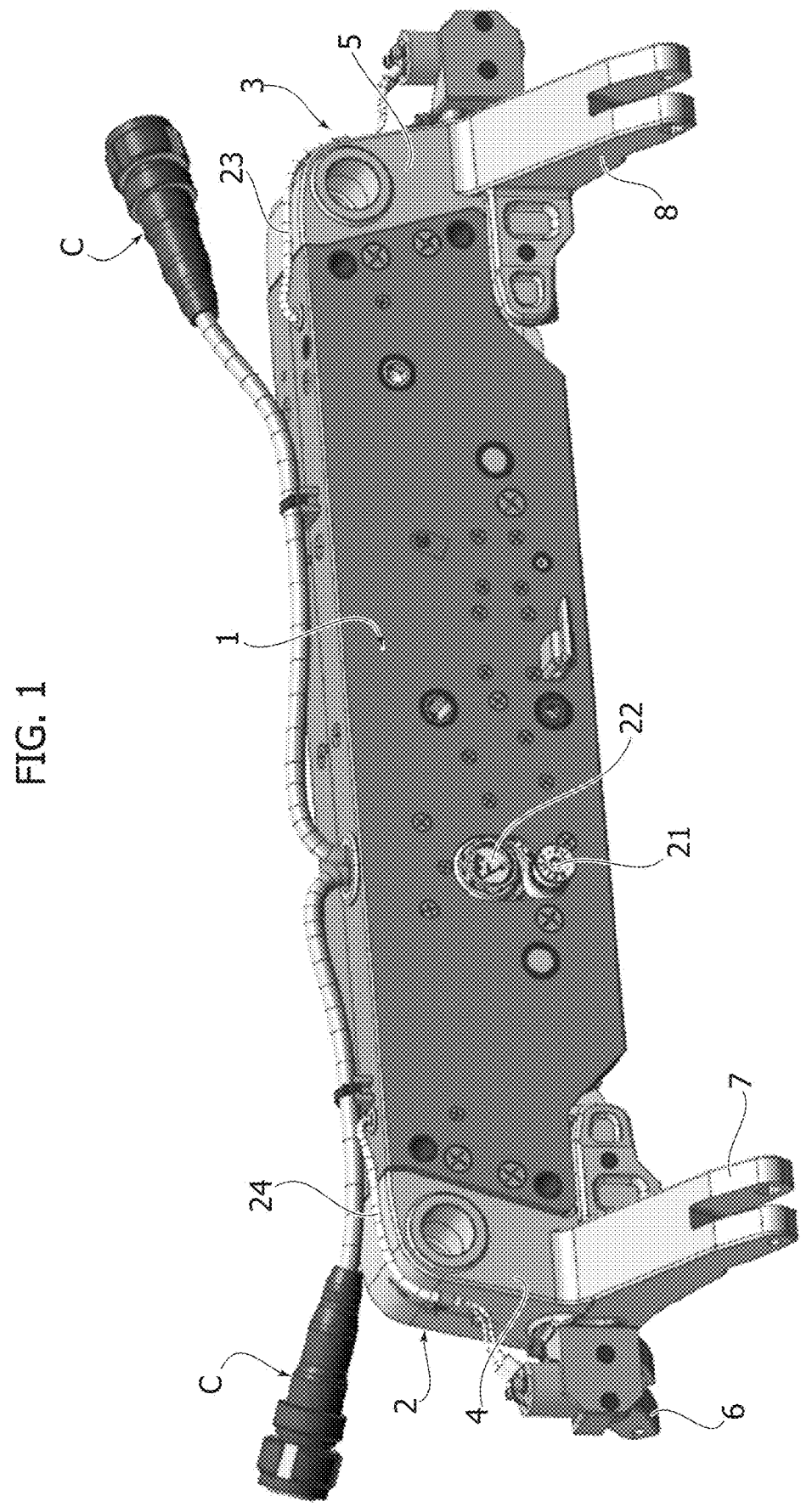
FIG. 1 is a side elevational schematic view of an example of a restrain and release mechanism made according to the invention.

With reference to FIG. 1, the release mechanism according to the invention comprises a central body 1 with extended parallelepiped shape, from which there protrudes a pair of electric connections C which connect the on-board systems of the aircraft to a CPU for controlling the mechanism, not shown given that it is generally known.

From the two lateral end faces of the central body 1 there protrude respective load supports 2,3, each comprising an inverted Y-shaped body 15, having an upper central section 4,5 provided with an internal seat forming a cylinder 19 to be addressed hereinafter, from which a pair of arms 6-7,8-9, better visible in FIGS. 2 and 3, to be addressed hereinafter, branch out inferiorly.

Figure 4:
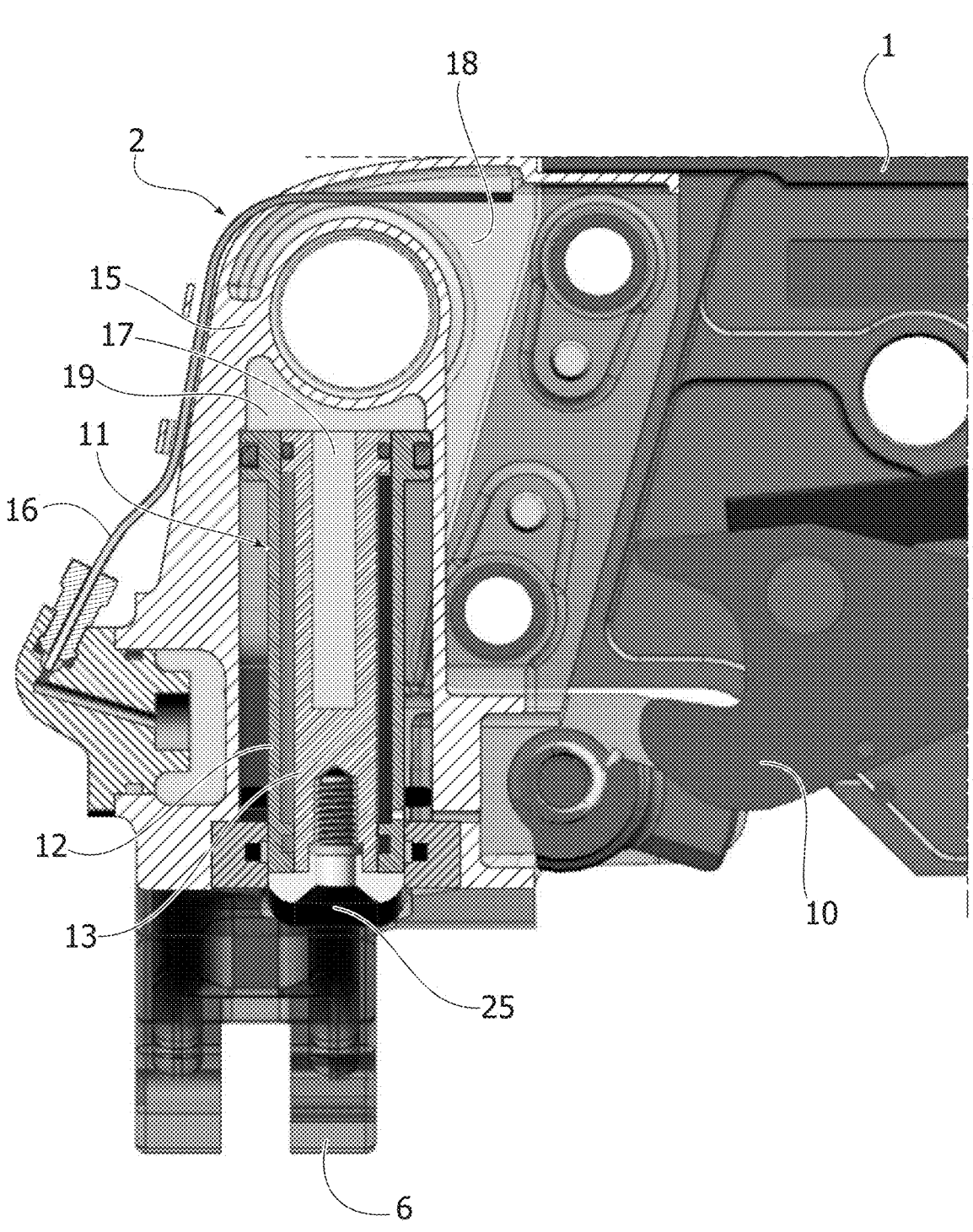
Figure 5:
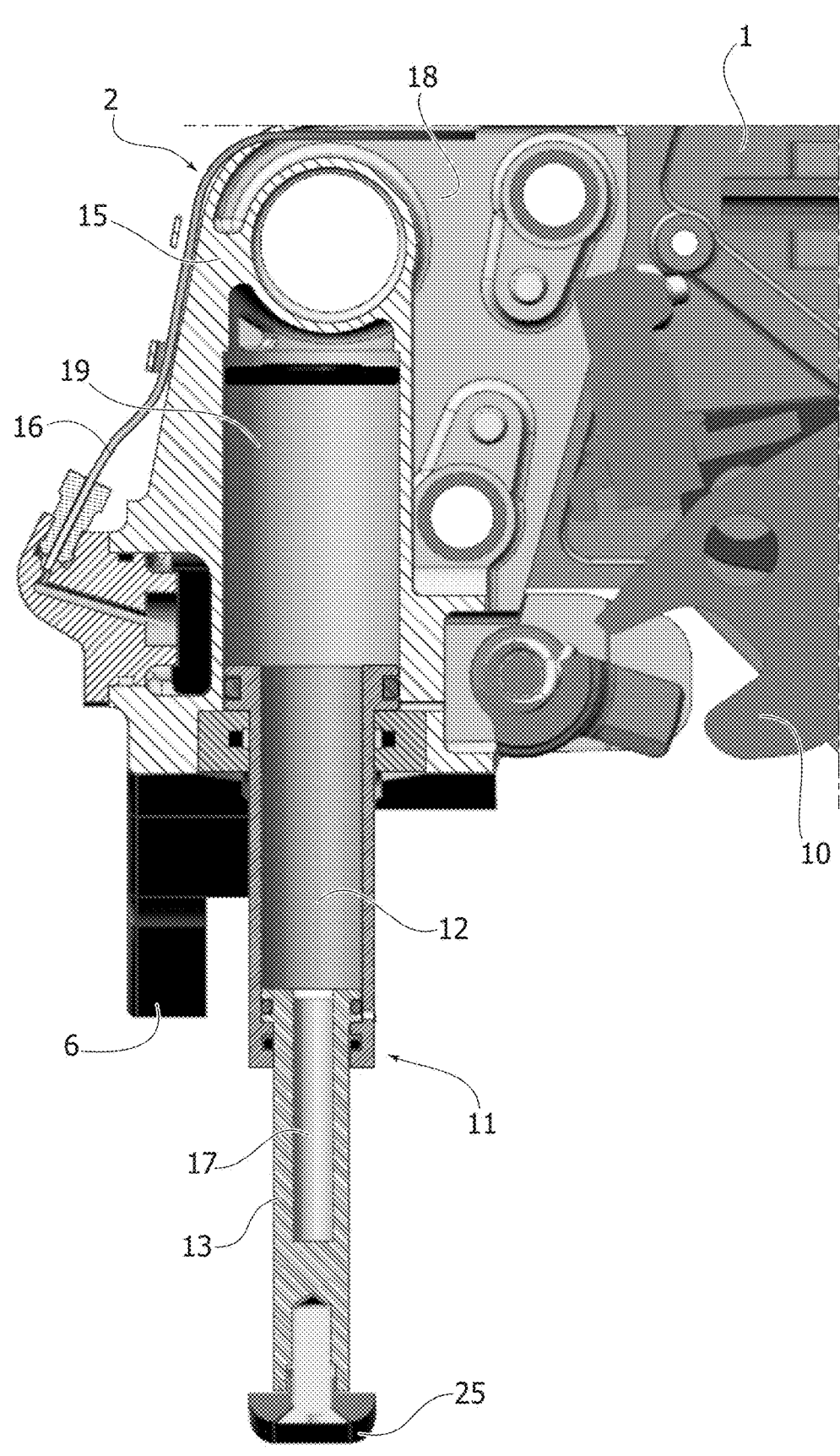

Now, with reference to FIGS. 4 and 5, a releasable load locking device is indicated with 10; in this embodiment, such device comprises a hook 10 for each of the load supports 2,3. Each hook 10 is movable between a raised load restrain position, visible in FIG. 4, and a lowered release position, visible in FIG. 5.

The mechanical system designed to operate the hooks 10, not shown, is based on a conventional articulated quadrilateral normally including a pair of solenoids operating in a parallel fashion by redundancy.

Still with reference to the FIGS. 4 and 5, the mechanism according to the invention comprises a pneumatic device for moving away the load during its release, including a pair of telescopic stems 11 operated by compressed air.

Each stem 11 comprises two coaxially slidable shanks 12,13 in the respective cylinder 19 and subjected to the action of the pressurised air supplied to the thrust chamber 17 which acts on the shanks 12,13 moving the stem 11 from the retracted inoperative position within a respective of the aforementioned seats 19 of the central sections 4,5 of the bodies 15, visible in FIG. 4, to a load thrust position, visible in FIG. 5, in which the shanks 12,13 of the stems 11 protrude inferiorly with respect to the arms 6-7,8-9.

Conveniently, according to the invention the aforementioned load supports 2,3 are made hollow so as to form a tank for the compressed air. In particular, the arms 6-7,8-9 and an inner peripheral portion of each central section 4,5 of the supports 2,3 comprise airtight cavities 18 connected to each other so as to form the tank for storing the compressed air required for operating the pneumatic device for moving away the load.

Figures 2, 3:
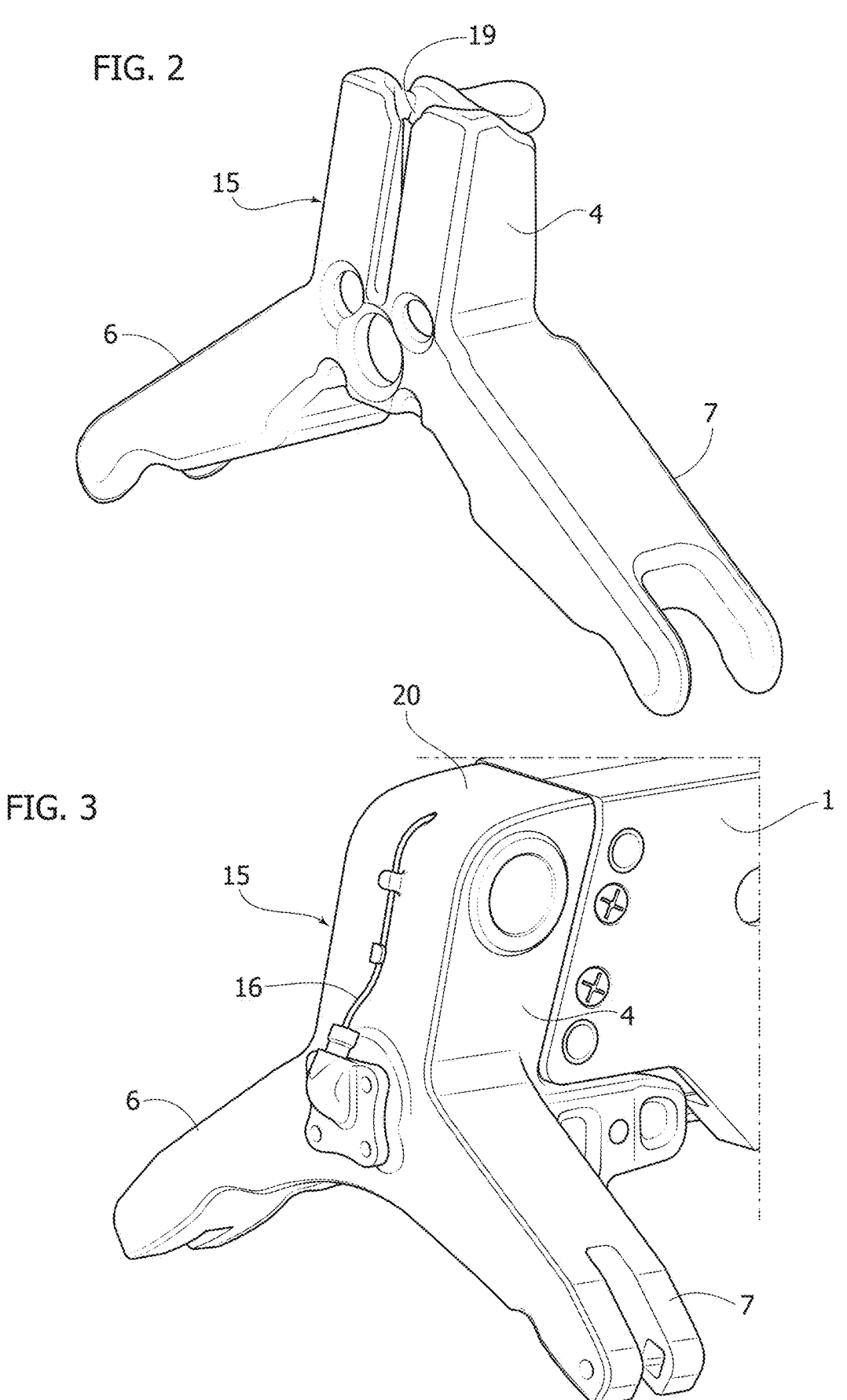
FIG. 2 is a perspective view of the hollow monolithic body according to the invention.
FIG. 3 is a perspective view and in larger scale of a portion of FIG. 1, and FIGS. 4 and 5 are partially selected front schematic views of FIG. 3 which show the telescopic stems of the mechanism according to the invention in the two different operating configurations.

Particularly with reference to FIG. 2, in the preferred embodiment of the invention each load support 2,3 consists of an inverted Y-shaped hollow monolithic metal body 15, made by means of a per se known additive manufacturing process.

Due to such configuration, each hollow monolithic metal body 15 is capable, in use, to store the pressurised air required to operate the stems 11 which move the load away, significantly reducing the overall dimensions of the mechanism according to the invention.

Such advantage is further enhanced by the fact that besides the chambers 18 even the cylinders 19 of the telescopic stems 11 are integrated in the supports 2, 3 by means of the aforementioned additive manufacturing process.

Furthermore, considering that no additional device must be installed on board the vehicle, the mechanism according to the invention allows to drastically facilitate installation on the designated aircraft, while maintaining high effectiveness in moving away the load whenever there arises the need.

Once again with reference to the FIGS. 4 and 5, each support 2,3 comprises a duct 16 which places the cavity 18 for storing the compressed air in communication with the internal thrust chamber 17 of the cylinder 19 of the respective thrust stem 11.

Furthermore, with reference to FIG. 1, the mechanism according to the invention comprises a pneumatic connection 23,24, partially embedded in the body 1, which connects the load supports 2,3 together, therefore ensuring a uniform pressure acting on the two telescopic stems 11: a condition required to have a thrust force which acts on the load in a balanced manner, allowing its release without pitch.

In a front portion of the body 1 there is provided for an air inlet 21 so as to load/unload the compressed air, and a manometer 22 to display the pressure value in the mechanism.

For the safety of the operator, besides displaying through the manometer 22, the mechanism according to the invention may provide for a safety device which, lying on the air inlet 21, prevents the manual opening of the system should pressurised air be present in the circuit.

Now, described below is the operation of the mechanism for restraining and releasing an external airborne load according to the invention.

When transporting the load, the thrust chambers 17 of the telescopic stems 11 are subjected to an initial pressure, given by the compressed air in the volume inside the supports 2,3. However, the shanks 11,12 are held in the retracted position by the pressure action exerted by the still constrained load on the end plate 25 of each stem 11.

During the ejection step, the movement for releasing the hooks 10 of the device for suspending the load allows to release the load from the supports 2,3 and, the action for extending the shanks 12,13 of the stems 11 free to move at this point, imparts a force for moving away the load by means of the plate 25. Such force is proportional to the pressure of the compressed air contained in the storage tank, formed by the cavities of the load supports 2,3, which are in turn pneumatically connected to the thrust chambers 18 of the stems 11.

The action of the stems 11 of the mechanism according to the invention allows to move the load away from the aircraft with an acceleration greater than that of gravity, over the entire duration of their mechanical stroke. When the shanks 12,13 of the stems 11 reach the end-of-stroke, the load continues the separation step remaining subjected to the force of gravity alone. The pressure value used when loading the tanks determines the final load ejection velocity, proportional to its mass and inertia.

Therefore, this architecture offers the possibility to move the loads away with a greater velocity as compared to gravitational mechanisms hence resolving, for example, some criticalities on particularly high-performance helicopters or with particularly light loads, while not generating structural criticalities which are burdensome for the aircraft.

Obviously, the construction details and the embodiments may widely vary with respect to what has been described and illustrated, without departing from the scope of protection of the present invention as defined in the claims that follow.

The invention claimed is:

1. Restrain and release mechanism for an external airborne load, comprising
   a central body having at ends thereof a pair of load supports each provided with a pair of protruding arms, and at least one releasable load locking device,
   a pair of telescopic stems movable within respective cylinders associated to said load supports and operated by a compressed air from a first retracted inoperative position, to a second extended push position,
   wherein said load supports are made hollow to form storage tanks to hold the compressed air prior to actuation of the telescopic stems;
   a pneumatic connection connecting said tanks with each other such that the compressed air is at a uniform pressure to provide such uniform pressure to the pair of telescopic stems; and
   ducts connecting the tanks to thrust chambers to provide compressed air from the tanks to the thrust chambers to actuate the telescopic stems.

2. Mechanism according to claim 1, wherein said load supports embody said cylinders.

3. Mechanism according to claim 1, wherein each of said load supports consists of a hollow monolithic metal body formed as a single piece by additive manufacturing, and defining internal pressure cavities structurally integrated in the load-support body and configured to store the compressed air.

4. Mechanism according to claim 1, wherein each of said load supports consists of an inverted Y-shaped body, having an upper central section provided with an internal seat forming said cylinder to house said telescopic stem, and from which a pair of support arms branch out inferiorly.

5. Mechanism according to claim 1, wherein said central body comprises a pneumatic connection which connects said hollow load supports together.

6. Mechanism according to claim 1, wherein each of said stems comprises a lower end plate and it is maintained in said retracted position by the pressure exerted by the constrained load on said plate.

7. System according to claim 6, wherein said load support consists of a swiveling pad arm.

8. System for constraining an external load for use in the aeronautical and aerospace industries, comprising a restrain and release mechanism according to claim 1.

* * * * *